United States Patent
Gabber et al.

(10) Patent No.: US 6,742,125 B1
(45) Date of Patent: May 25, 2004

(54) DISTRIBUTED PROTOCOL FOR SECURE COMMUNICATION OF COMMERCIAL TRANSACTIONS AND DECENTRALIZED NETWORK EMPLOYING THE PROTOCOL

(75) Inventors: Eran Gabber, Summit, NJ (US); Abraham Silberschatz, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1266 days.

(21) Appl. No.: 08/748,314

(22) Filed: Nov. 13, 1996

(51) Int. Cl.$^7$ ............................ H04L 9/00; G06F 17/60
(52) U.S. Cl. ........................................ 713/201; 705/39
(58) Field of Search ...................... 730/26, 27; 380/30; 705/39

(56) References Cited

U.S. PATENT DOCUMENTS

| | | | |
|---|---|---|---|
| 5,220,501 A | | 6/1993 | Lawlor ........................ 364/408 |
| 5,809,144 A | * | 9/1998 | Sirbu et al. .................... 380/25 |
| 5,901,229 A | * | 5/1999 | Fujisaki et al. ............... 380/30 |
| 5,909,492 A | * | 6/1999 | Payne et al. ................... 380/24 |
| 6,029,150 A | * | 2/2000 | Kravitz ........................ 705/39 |

OTHER PUBLICATIONS

Schneier. Applied Cryptodraphy, John Wiley & Sons Inc. pp. 26, 34–44, 195–187, Oct. 1995.*
Cerne, Taking Those First Few Steps. Credit Card Management Page: 94, pp. 1–7, Nov. 1, 1996.*
Paper entitled "The SSL Protocol. Version 3.0" by Alan O. Freier, Philip Karlton and Paul C. Kocher; Mar. 1996: pp. 1–56.
Publication by "Communications of the acm" dated Oct. 1989; vol. 32 No. 10; entitled "Practical Performance of Bloom Filters and Parallel Free–Text Searching" pp. 1237–1230.
Paper by Senix entitled "Chrg–http: A Tool for Micropayments on the World Wide Web" by Lei Tang and Steven Low: Jul. 1996.
Paper entitled "The Millicent Protocols for Electronic Commerce" by Mark S. Manasse of Systems Research Center, Digital Equipment Corporation.
Article entitled "Achieving Electronic Privacy" by David Chaum: from Scientific American, Aug. 1992, pp. 96–101.
Paper entitled "NetBill Security and Transaction Protocol" by Benjamin Cox, J.D. Tygar and Marvin Sirbu of Carnegie Mellon University.

(List continued on next page.)

*Primary Examiner*—Matthew Smithers

(57) ABSTRACT

A protocol and system for securely communicating a financial transaction between a customer and a merchant and a distributed computer network employing the protocol or system. A central authority having a central authority private key $K^s_{ca}$ assigns a customer account ("CACCT") to the customer and a merchant account ("MACCT") to the merchant. The customer has a customer public key $K^P_c$; the merchant has a merchant public key $K_m$. The protocol includes the steps of: (1) sending a quotation from the merchant to the customer, the quotation including the $K^P_m$, a $K^s_{ca}$-signed signature that is a function of the MACCT, an unsigned copy of a price and a $K^s_m$-signed signature that is a function of the MACCT and the price, (2) replying to the quotation by sending an order from the customer to the merchant, the order including the $K^P_c$, a $K^s_{ca}$, signed signature that is a function of the CACCT, an unsigned copy of the price and a $K^s_c$-signed signature that is a function of the CACCT, the MACCT and the price and (3) replying to the order by filling the order.

44 Claims, 7 Drawing Sheets

OTHER PUBLICATIONS

"Secure Electronic Transaction (SET) Specification; "Book 1: Business Description: Version 1.0; May 31, 1997 (This is a summary of "SET Secure Electronic Transaction Specification;" Book 2: Programer's Guide: Version 1.0; May 31, 1997—the Table of contents which is attached hereto).
Paper by Senix entitled "iKP—A Family of Secure Electronic Payment Protocols" Authors—Amir Herzeberg, Hugo Krawczyk, Michael Steiner, Gene Tsudik and Michael Waidner; Jul. 1995.

Memo entitled "The Secure HyperText Transfer Protocol" by E. Rescorla and A. Schiffman; Enterprise Integration Technologies; Jul. 1995; pp. 1–41.

* cited by examiner

DISTRIBUTED PROTOCOL FOR SECURE COMMUNICATION OF COMMERCIAL TRANSACTIONS AND DECENTRALIZED NETWORK EMPLOYING THE PROTOCOL

TECHNICAL FIELD OF THE INVENTION

The present invention is directed, in general, to cryptography and, more specifically, to a distributed protocol that allows transactions to be communicated securely by a small number of messages and a decentralized network in which the protocol may be employed for commerce thereover.

BACKGROUND OF THE INVENTION

The availability of more efficient, reliable and cost effective computers has allowed great numbers of small to medium sized companies, as well as individuals, to acquire tools necessary to compete in today's electronic marketplace. The immeasurable gains in technology experienced by the computer industry have allowed both companies and individuals to rely on commercially available computers, such as personal computers ("PCS"), to meet their information processing and communication needs. To that end, most PCS are equipped with an interface that may facilitate communication over private or public networks, such as the INTERNET.

Given the inherent insecurity of electronic commerce, particularly over public networks, it was long felt that a system that could ensure secure electronic transactions would be highly advantageous. In general, such a system would authenticate the parties to the transaction and provide transactions that are resistant to tampering—a secure system should be resistant to fraud.

One moderately successful effort introduced the concept of "closed" communities—local and long distance telephone companies, cable companies, cellular telephone companies, E-mail services and electronic service providers. These communities are "closed" because their customers have to enter into a contractual relationship with a provider before entering into the program, thus the customer must be a member in order to use the offered products and services.

One adaption of this method is described in U.S. Pat. No. 5,453,601 (the "'601 Patent"), entitled ELECTRONIC-MONETARY SYSTEM, issued Sep. 26, 1995, which is incorporated herein by reference. The '601 Patent introduces an anonymous electronic monetary system as an alternative medium of exchange to credit cards, cash, checks, etc. More particularly, the system uses money modules encapsulated in tamper-proof envelopes to store and transfer electronic notes.

This system of remote, anonymous purchases, however, fails to ensure both payment and delivery. If a customer purchases a software package anonymously over the INTERNET, for example, there is no mechanism to ensure that the customer will receive the software if the customer has already paid for the software. Conversely, how can the merchant be sure it will be paid if it delivers its goods before payment. Thus, to ensure payment and delivery, the customer and merchant are required to give up their anonymity, one of the primary objects of the system.

An alternate system uses a distributed, low-overhead, digital cash protocol. See, THE MILLICENT PROTOCOL FOR ELECTRONIC COMMERCE, by Mark S. Maasse, published at the FIRST USENIX WORKSHOP ON ELECTRONIC COMMERCE, New York, N.Y. (Nov. 12, 1995) (the "Millicent System").

The Millicent System introduces a digital scrip, which is digital "money," that is honored by a single merchant. The obvious drawback being the requirement of preparation before a purchase from a new merchant, namely, purchasing scrip from a third-party broker—a separate transaction having its own overhead. An added complication involves a system for returning change as the value of the scrip is often higher than the price of the goods. Thus the merchant returns change to the user in the form of "other" scrip—which is honored only by the issuing merchant—forcing the customer to use the same with the merchant at a later time or to redeem it with the third-party broker, possibly for some processing fee.

These conventional systems and protocols, like others common to the industry, are expensive, whether overtly or surreptitiously. The widespread use of electronic commerce on the INTERNET and, more particularly, the WORLD WIDE WEB, requires mechanisms for dealing with high volumes of low-priced transactions—transactions of such low monetary value that merchants cannot afford to communicate with the bank for every transaction. There is a need therefore for a class of electronic commerce protocols that structures and secures electronic commercial transactions that can be optimized most preferably to be comparable to substantially free INTERNET and WORLD WIDE WEB browsing in terms of messaging overhead.

SUMMARY OF THE INVENTION

The present invention introduces the broad concept of securely communicating a financial transaction without requiring communication between a central authority and either a merchant or a customer during the transaction. This significantly reduces the bandwidth required to complete the transaction, as only three messages (the quotation, order and a reply thereto) are required to complete the transaction. The quotation may be sent in response to an optional quotation request sent from the customer to the merchant.

Thus, to address the above-discussed deficiencies of the prior art, the present invention provides a protocol and system for securely communicating a financial transaction between a customer and a merchant and a distributed computer network employing the protocol or system. An exemplary central authority may be associated with a central authority private key $K^s_{ca}$ and a central authority public key $K^P_{ca}$, and is responsible for assigning a customer account ("CACCT") to the customer and a merchant account ("MACCT") to the merchant. The customer is associated with a customer private key $K^s_c$ and a customer public key $K^P_c$; the merchant is associated with a merchant private key $K^s_m$ and a merchant public key $K^P_m$. Of course, the central authority may be separate entities, one associated with the customer and the other with the merchant.

The protocol includes the steps of: (1) sending a quotation from the merchant to the customer, the quotation including at least the $K^P_m$, a $K^s_{ca}$-signed signature that is a function of the MACCT, an unsigned copy of a price and a $K^s_m$-signed signature that is a function of the MACCT and the price, (2) replying to the quotation by sending an order from the customer to the merchant, the order including at least the $K^P_c$, a $K^s_{ca}$-signed signature that is a function of the CACCT, an unsigned copy of the price and a $K^s_c$-signed signature that is a function of the CACCT, the MACCT and the price and (3) replying to the order by the merchant filling the order. The invention employs signatures based on public key cryptography (e.g., RSA, etc.).

For security purposes, each of the central authority, the customer and the merchant may, be responsible for selecting their respective public and private keys. The central authority may also be responsible for generating a merchant identification, "Mid," for the merchant which may contain the merchant's account, M$_{ACCT}$, and the merchant's public key, K$^P_m$. The central authority may generate a signed merchant identification, "SMid," that contains Mid and a K$^s_{ca}$-signed signature that is a function of Mid. The central authority may generate a customer identification, "Cid," for the customer, that contains the customer account, C$_{ACCT}$, and the customer's public key K$^P_c$. The central authority may generate a signed customer identification, "SCid," that contains Cid and a K$^s_{ca}$-signed signature that is a function of Cid.

Most preferably, once the customer sends the order and the merchant accepts it (either with or without verification thereof), neither the customer nor the merchant is authorized to repudiate the transaction. It is preferred that only the central authority or an arbiter (to be defined below) be given that authority. Further, public-key encryption allows each party to authenticate the other and any information obtained from the other (such as price) without compromising encryption keys.

It should be noted that, since the private key is known only to the signing party, and the private key is extremely hard to compute given the public key, any message signed by a private key of a given party can be used as a proof that the same was knowingly originated by that party. The terms "central authority" and "bank" are used interchangeably herein to designate a trusted third party charged with creating and governing the use of C$_{ACCTS}$ and M$_{ACCTS}$, and, hence, Cids, SCids, Mids and SMids. "Bank" therefore does not necessarily mean "bank" in the traditional sense. Those skilled in the art will realize that the broad system contemplated by the present invention may include any number of customers, merchants, central authorities, banks, arbiters, etc.

In one embodiment of the present invention, the quotation further includes an unsigned sequence number unique to the merchant, the K$^s_m$-signed signature further being a function of the sequence number. In a related embodiment of the present invention, the order further includes an unsigned sequence number unique to the merchant, the K$^s_c$-signed signature further being a function of the sequence number. The sequence number should be unique to the transaction and unique to the merchant. The sequence number does not, however, have to be unique among all merchants transacting over a single computer network. The sequence number uniquely identifies the transaction, ensuring that duplicate orders (whether inadvertent or intentional) are ignored.

In an advantageous embodiment, the order includes SCid. In an alternate advantageous embodiment, the quotation includes SMid. In related embodiments, the merchant and the customer may use respectively SCid and SMid to verify the other. The use of public key cryptography to provide information between the customer and the merchant enables the parties to verify one another, as well as providing a means for securing the same from third party interference. An eavesdropper may therefore not use the customer's order to purchase items fraudulently from the same or other merchants, since the order contains a K$^s_c$-signed signature that may be a function of C$_{ACCT}$, M$_{ACCT}$ and the price. Thus the order is valid only with connection with the original quotation.

In one embodiment of the present invention, the M$_{ACCT}$ has an expiration date associated therewith, the quotation further including the expiration date, the K$^s_m$-signed signature further being a function of the expiration date. In a related embodiment of the present invention, the C$_{ACCT}$ has an expiration date associated therewith, the order further including the expiration date, the K$^s_c$-signed signature further being a function of the expiration date. The expiration date ensures that C$_{ACCT}$ and M$_{ACCT}$ are changed frequently. This prevents long term fraud should a particular C$_{ACCT}$, M$_{ACCT}$, or key become compromised. It should be noted that the expiration dates of these embodiments may be associated with the Mid or Cid of M$_{ACCT}$ or C$_{ACCT}$, respectively. Changing keys frequently reduces the possibility of counterfeiting digital signatures by computing private keys from public keys, which is very time consuming. Furthermore, the expiration date forces customers to meet their obligations to the bank, such as paying their bills in a timely manner. Otherwise, the bank may not issue a new SCid to the customer when the current SCid expires.

In one embodiment of the present invention, the central authority has a central authority identification number ("CAid"), the quotation further including the CAid, the K$^s_m$-signed signature further being a function of the CAid. In one embodiment of the present invention, the central authority has a central authority identification number (CAid), the order further including the CAid, the K$^s_c$-signed signature further being a function of the CAid. The CAid allows both customer and merchant to reference themselves to a commonly-trusted entity.

In one embodiment of the present invention, the protocol further comprises the step of verifying, by the customer, the M$_{ACCT}$ and the price. In one embodiment of the present invention, the protocol further comprises the step of verifying, by the merchant, the C$_{ACCT}$, the M$_{ACCT}$ and the price. In the embodiment to be illustrated and described, the customer and the merchant each take advantage of the verification features of the present invention's protocol to verify the identity of (authenticate) each other and the contents of each other's messages (quotations and orders).

In one embodiment of the present invention, the order is an order for data to be delivered via a computer network. Those skilled in the art are aware that information itself is often a valuable commodity. The present invention contemplates the sale of information over a computer network, as well as the sale of more traditional services or hard goods.

In one embodiment of the present invention, a database associated with the merchant contains a list of C$_{ACCTS}$ revoked by the central authority, the protocol further comprising the step of comparing the C$_{ACCT}$ against the list of C$_{ACCTS}$ revoked by the central authority. Thus, the central authority can exercise governance over its C$_{ACCTS}$.

In one embodiment of the present invention, the protocol further comprises the steps of: (1) maintaining, by the merchant, a record of purchases by the customer and (2) sending a message from the merchant to the central authority regarding the customer when the purchases exceed a predetermined maximum allowable amount. In this way, C$_{ACCTS}$ can be made subject to credit limits.

In one embodiment of the present invention, the protocol further comprises the steps of: (1) maintaining, by the merchant, a record of purchases and times of the purchases by the customer and (2) sending a message from the merchant to the central authority regarding the customer when the purchases exceed a predetermined maximum allowable rate. This allows the protocol to track suspiciously high account activity (perhaps indicating fraud). In an embodiment to be described, purchase amounts and times are only two of many variables that can be employed to establish security against significant fraud.

In one embodiment of the present invention, the protocol further comprises an arbitration procedure, comprising the steps of: (1) including a field in the quotation that is a function of information that, is a subject of the quotation, (2) sending an arbitration request from the customer to an arbiter, the arbitration request containing the quotation and the order, (3) sending an information request from the arbiter to the merchant, the information request requesting a copy of the information that is the subject of the quotation, (4) forwarding the information that is the subject of the quotation to the customer if the information correlates to the field, (5) repudiating the financial transaction if the merchant fails to respond to the information request and (6) repudiating the financial transaction if the information fails to correlate to the field. The arbitration procedure allows the arbiter (who may also be the central authority acting in the capacity of an arbiter) to resolve conflicts between the customer and the merchant. If the customer is at fault, the arbiter can vouch for the merchant's compliance with the contract. If the merchant is at fault (either by deviating from the originally bargained-for information or by failing to respond to the request for the information), the arbiter has the power to repudiate (rescind) the financial transaction.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects and in which.

DETAILED DESCRIPTION

Figure 1:
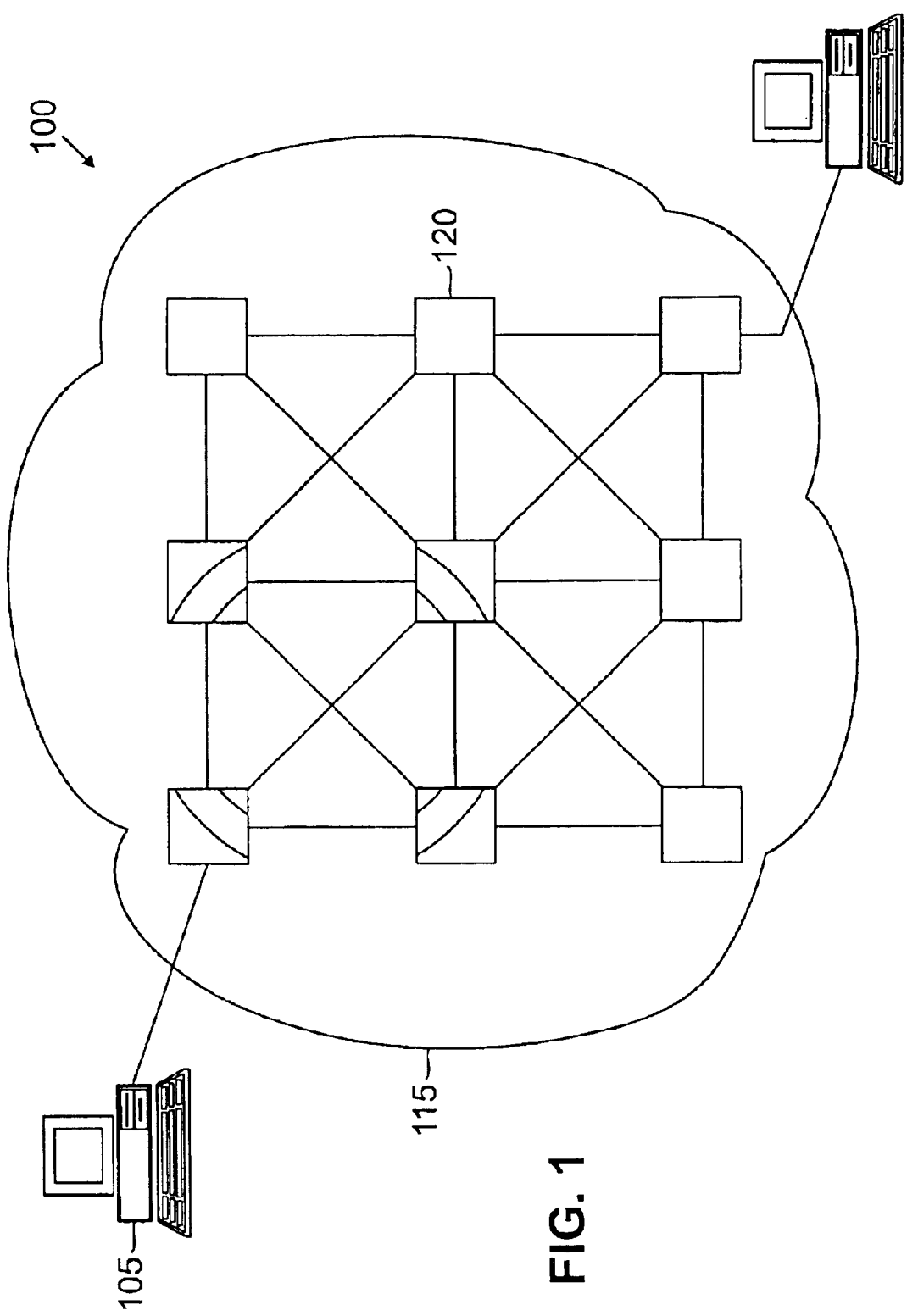
FIG. 1 illustrates a high-level block diagram of an exemplary distributed computer, or communications, network with which the principles of the present invention may be suitably used to securely communicate a financial transaction between a customer and a merchant.

Referring initially to FIG. 1, illustrated is a high-level block diagram of an exemplary distributed computer, or communications, network (generally designated 100) with which the principles of the present invention may be suitably used to securely communicate a financial transaction between a customer 105 and a merchant 110. Customer 105 and merchant 110 are illustratively associated by an exemplary network of networks 115, such as the INTERNET, which includes the WORLD WIDE WEB, for example. The WORLD WIDE WEB is not a network itself—it is an "abstraction"— maintained on top of the INTERNET by a combination of browsers, servers and HTML pages.

Although an advantageous embodiment of the present invention may be suitably implemented for and used over the INTERNET, and WORLD WIDE WEB, the principles and broad scope of the present invention may be associated with any appropriately arranged computer, or communications, network, whether wired or wireless. Further, though the principles of the present invention are illustrated using a single customer 105 and a single merchant 110, alternate embodiments within the scope of the same may include a plurality of customers 105, merchants 110, central authorities, banks, arbiters, or the like, each of which is discussed in detail hereinbelow. The INTERNET as well as its conventional communication protocols are well known.

According to the illustrated embodiment, exemplary computer network 100, in addition to exemplary customer 105, merchant 110 and other computer systems comprising INTERNET 115, includes a plurality of insecure communication channels and a distributed network operating system. The insecure communication channels operate to intercouple ones of the various computer systems of network 100.

The concept of communication channels is known and allows insecure communication of information among ones of the intercoupled computer systems, such as customer 105 and merchant 110 for example. The distributed network operating system, executes on at least some of the computer systems, and manages the insecure communication of information therebetween. Distributed network operating systems are well known.

The illustrated embodiment also includes a protocol according to the present invention, that executes in association with the operating system, and allows secure communication of financial transactions between, for example, customer 105, merchant 110 and at least a third computer system within INTERNET 115. The protocol may be implemented in application software, such as for WEB browsers and servers (e.g., applettes, common gateway interface scripts, etc.). This third computer system may be designated a central authority 120 which is associated with a central authority private key $K^s_{ca}$, a central authority public key $K^P_{ca}$ and operates to assign a customer account ("CACCT") to customer 105 and a merchant account ("MACCT") to merchant 110. Each of exemplary customer 105 and merchant 110 may be respectively associated with each of a customer private key, $K^s_c$, and a customer public key, $K^P_c$, and each of a merchant private key, $K^s_m$, and a merchant public key, $K^P_m$. Public key cryptography techniques are known.

According to the exemplary protocol, each exemplary customer 105 may be associated with a customer identification, "Cid," that includes CACCT and a customer public key, $K^P_c$. Each exemplary merchant 110 may be associated with a merchant identification, "Mid," that includes MACCT and merchant public key, $K^P_m$. Central authority 120 generates a signed customer identification, "SCid," for customer 105, that includes Cid and a $K^s_{ca}$-signed signature that may be a function of Cid. Central authority 120 generates a signed merchant identification, "SMid," for merchant 110, that includes Mid and a $K^s_{ca}$-signed signature that may be a function of Mid. Merchant 110 begins a transaction by sending a quotation from itself to customer 105, possibly in response to a request for quotation from customer 105.

The quotation includes at least each of the $K^P_m$, a $K^s_{ca}$-signed signature that is a function of the MACCT, an unsigned copy of a price and a $K^s_m$-signed signature that is a function of the MACCT and the price. Customer 105 may reply positively to the quotation and send an order from itself to merchant 110, the order includes at least each of the $K^P_c$, a $K^s_{ca}$-signed signature that is a function of the CACCT, an unsigned copy of the price and a $K^s_c$-signed signature that is a function of the CACCT, the MACCT and the price. Merchant 110 replies positively to the order and fills the same. Use of electronic signatures, generally, is known and such signatures may be verified using any suitable conventional means. For security purposes, each of the central authority, the customer and the merchant may be responsible for selecting their respective public and private keys. The central authority may also be responsible for generating a merchant identification, "Mid," for the merchant which may contain the merchant's account, MACCT, and the merchant's public key, $K^P_m$.

All customers 105 and merchants 110 have an account with some central authority 120, or bank, but not necessarily with the same bank—each bank has a billing period, during which customer and merchant identifications (e.g., Cid, Mid, etc.) associated with the accounts may be valid. The banks generate new identification for customers and merchants every billing period, thereby enabling the banks to ensure that customers 105 or merchants 110 pay their bills on time. Thus, use of the phrase "central authority" hereinabove may refer to a single institution or multiple institutions, such as a plurality of banks for example.

The protocol set forth hereinabove is discussed in greater detail hereinbelow and more particularly, a preferred embodiment is discussed with reference to FIGS. 6 to 7. Before undertaking more detailed discussions, however, a number of key words and phrases may be defined. A "merchant" may be a vendor that provides a good electronically. A "customer" may be a user, such as a person, robot, computer system, etc., as examples, that may want to acquire a good electronically. A "good" may often mean information (data, source code, object code, etc.) that may be suitably communicated electronically. The term "electronically" may mean electrically, optically, magnetically or the like. A "bank" may be any financial institution that manages customer or merchant accounts—a bank provides transaction processing capability, such as a credit card company for example, as set forth hereinabove. A "central authority," as the phrase is used herein, may include one or more banks and, possibly, as well as other functionality, such as one or more arbiters for example. The terms "central authority" and "bank" may therefore be used interchangeably to designate a trusted third party charged with creating and governing the use of CACCTs and MACCTs. An "arbiter" may be any device, system or entity that, in case of a dispute between a customer, a merchant, a bank or a central authority, settles the dispute. Arbiters may repudiate committed transactions. Each arbiter most preferably has a unique identifier, Aid, a private key, $K^s_a$, and a public key, $K^P_a$.

According to the illustrated embodiment, central authorities, banks and arbiters may be assumed to be trusted entities, while customers and merchants may be assumed to be non-trusted entities.

Further, the term "or" is inclusive, meaning and/or; the terms "include," "includes" or "including" mean inclusion without limitation; and the phrase "associated with" and derivatives thereof may mean to include within, interconnect with, contain, be contained within, connect to or with, couple to or with, be communicable with, juxtapose, cooperate with, interleave, be a property of, be bound to or with, have, have a property of, or the like.

Figure 2:
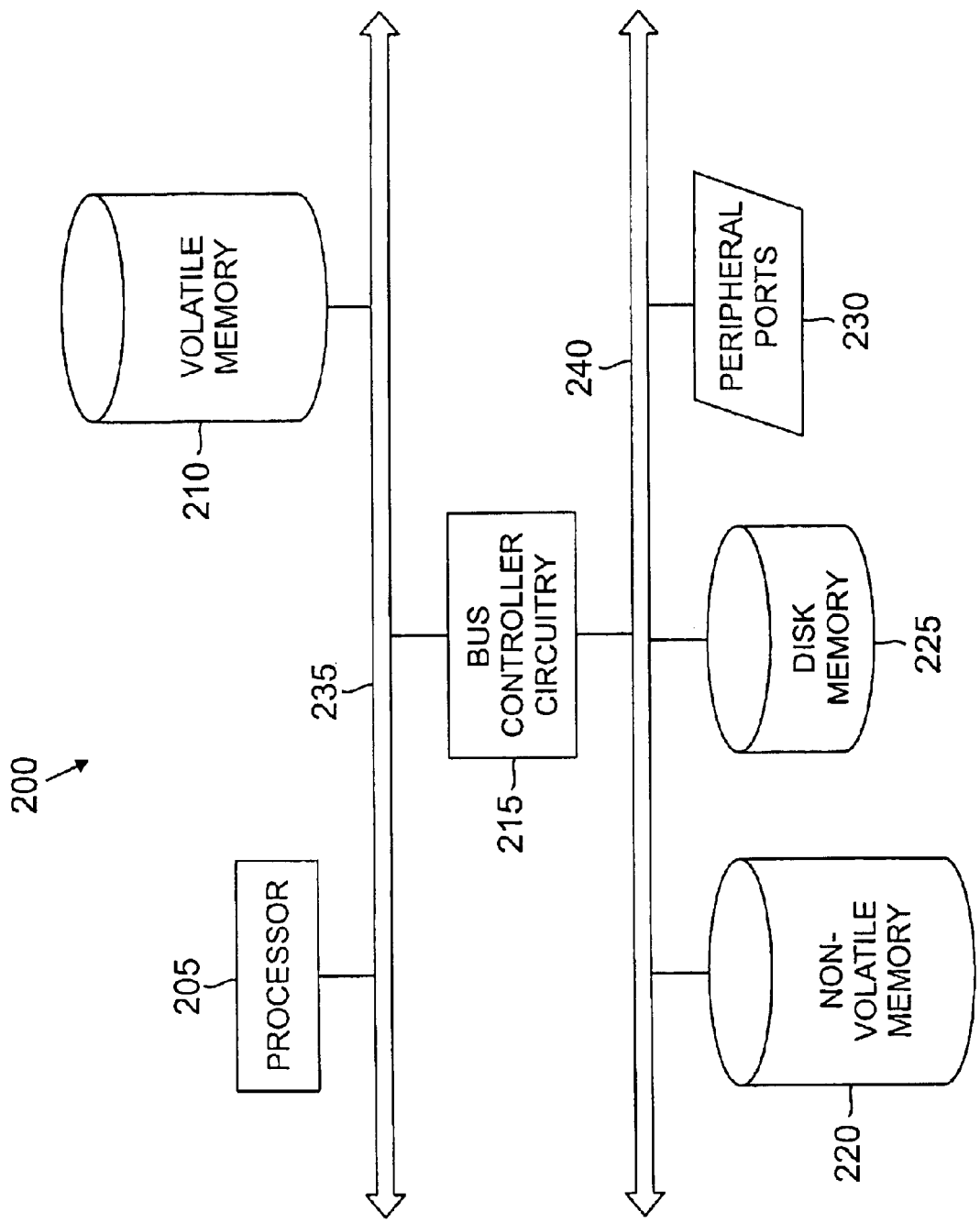
FIG. 2 illustrates a high-level block diagram of an exemplary computer, such as the customer, the merchant or a central authority according to FIG. 1.

Turning now to FIG. 2, illustrated is a block diagram of an exemplary computer system (generally designated 200), such as a personal computer, that may suitably provide an environment within which customer 105, merchant 110, central authority 120 or some other portion of exemplary network 115 may suitably be implemented and operated. Since the present invention is not limited to application in a personal computing environment, FIG. 2, like FIG. 1, is illustrative only. Alternate exemplary computers 200 may be mini, main frame, super or any other suitable computer, as well as networks of computers, such as local-area, metropolitan-area and wide-area networks, as other examples.

Exemplary computer 200 illustratively includes a processor 205, conventional volatile memory (e.g., random access memory) 210, bus controller circuitry 215, a conventional non-volatile memory (e.g., read only memory) 220, a conventional disk memory 225 and a set of peripheral ports 230. An exemplary host bus 235 is shown and is suitably operative to associate processor 205, volatile memory 210 and bus controller circuitry 215. An exemplary input/output ("I/O") bus 240 is shown and is operative to associate bus controller circuitry 215, non-volatile memory 220, video memory 225 and the set of peripheral ports 230. The set of peripheral ports 230 may suitably couple I/O bus 235 to any one or more of a plurality of conventional peripheral devices for communication therewith, such as communications circuitry for communication with INTERNET 115. Included among the set of peripheral ports 230 may be one or more serial or parallel ports.

Bus controller circuitry 215 provides suitable means by which host bus 235 and I/O bus 240 may be associated, thereby providing a path and management for communication therebetween. Each of the illustrated buses 235 and 240 requires a drive current to carry signals thereon. The illustrative circuit accordingly operates in conjunction with a conventional system controller (not shown) that supplies the required drive current.

In alternate advantageous embodiments, the processing circuitry associated with exemplary computer 200 may, in whole or in part, be replaced by or combined with any suitable processing configuration, including parallel processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuitry, controllers and systems described and claimed herein.

It should be noted that while computer system 200 illustratively includes a dual-bus configuration, alternate embodiments may include single-bus or greater than two-bus configurations.

For purposes of illustration, reference is made to FIG. 1. Assume that multiple computer systems 200 operate within network 100 and, more particularly, that each of customer 105 and merchant 110 is associated with a personal computer and central authority 120 is associated with a mini-computer. Collectively, customer 105, merchant 110 and central authority 120 may cooperate to securely communicate a financial transaction between customer 105 and merchant 110 according to the present invention.

Recall that central authority 120 is associated with a central authority private key $K^s_{ca}$ and may be operative to assign each of CACCT, Cid and SCid to customer 105 and MACCT, Cid and SCid to merchant 110. Recall further that customer 105 and merchant 110 respectively have a customer private key, $K^s_c$, and a customer public key, $K^p_c$, and a merchant private key, $K^s_c$, and a merchant public key, $K^p_m$.

An exemplary merchant 110 may include each of a quotation transmission controller, an order reception controller and an order confirmation controller. In an advantageous embodiment, each of these controllers is software-based and, upon execution, operates to drive computer 200 to perform various functions. In alternate advantageous embodiments, any of these controllers may be firmware- or hardware-based, or, alternatively, some combination of two or more of the same.

The exemplary quotation transmission controller, which may be responsive to a quotation request from customer 105, sends a quotation to customer 105. The quotation includes at least each of $K^p_m$, a $K^s_{ca}$-signed signature that is a function of MACCT, an unsigned copy of a price and a $K^s_m$-signed signature that is a function of MACCT and price. The exemplary order reception controller may receive an order from customer 105 in response to the quotation. The order includes at least each of $K^p_c$, a $K^s_{ca}$-signed signature that is a function of CACCT, an unsigned copy of the price and a $K^s_c$-signed signature that is a function of CACCT, MACCT and the price. The exemplary order confirmation controller confirms the order to customer 105.

Returning to FIG. 2, other aspects of this protocol are discussed in greater detail hereinbelow and, more particularly, a preferred embodiment is discussed with reference to FIGS. 6 to 7. Before these discussions are undertaken, it should be noted that conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); that conventional computer, or communications, network design is more fully discussed in *Data Network Design*, by Darren L. Spohn, McGraw-Hill, Inc. (1993); and that conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992).

Each of the foregoing publications is incorporated herein by reference for all purposes.

Figure 3:
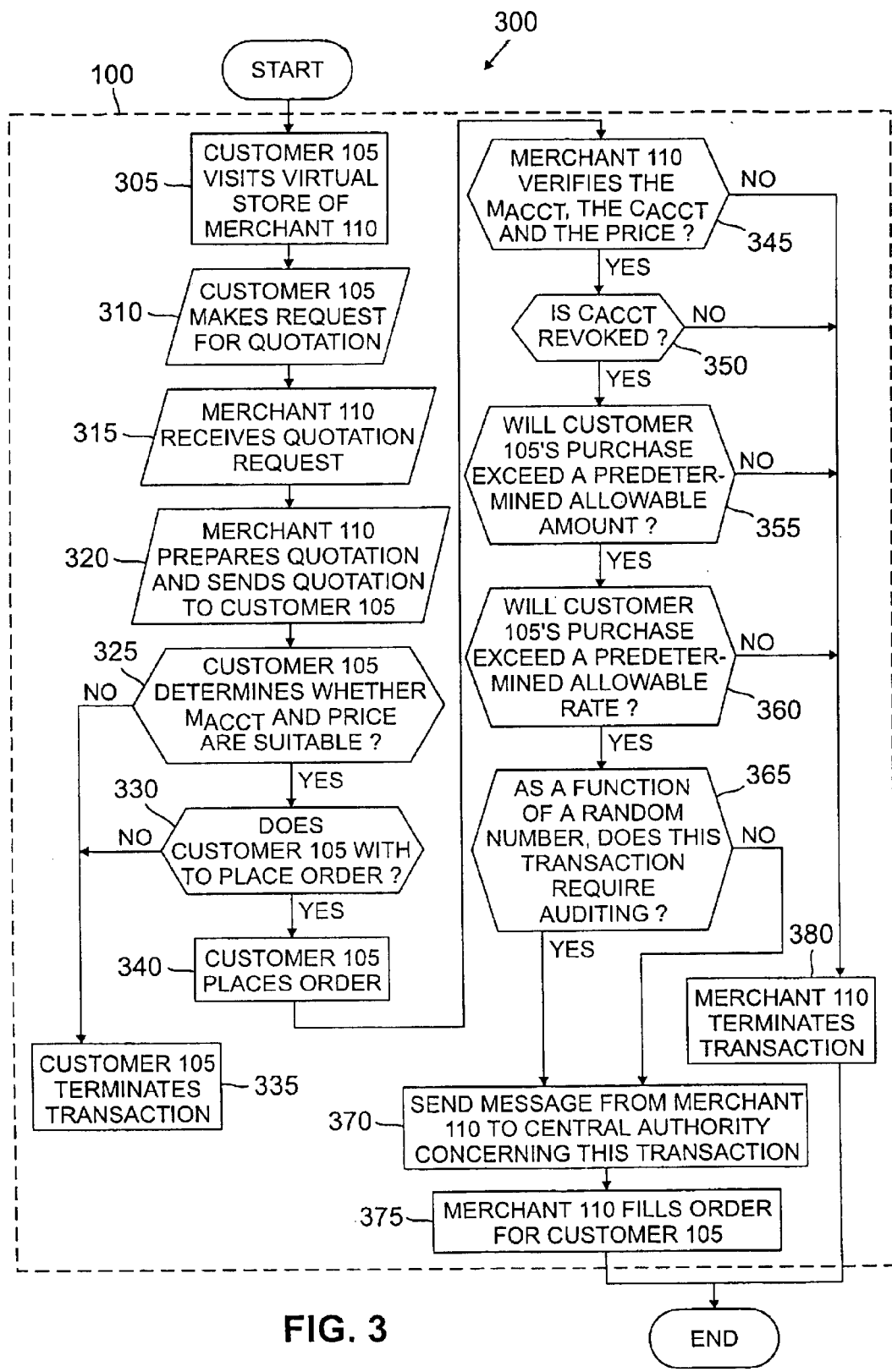
FIG. 3 illustrates a flow diagram of an advantageous protocol according to the principles of the present invention for securely communicating a financial transaction between the customer, the merchant or a central authority according to FIGS. 1 and 2.

Turning now to FIG. 3, illustrated is a flow diagram (generally designated 300) of an advantageous protocol for securely communicating a financial transaction between customer 105 and merchant 110 according to the present invention. Again, central authority 120 is provided and associated with a central authority private key, $K^s_{ca}$, and a central authority public key, $K^p_{ca}$, and is responsible for assigning a CACCT to customer 105 and MACCT to merchant 110. Customer 105 is associated with a customer private key, $K^s_c$, and a customer public key, $K^p_c$, and merchant 110 is associated with a merchant private key, $M^s_m$, and a merchant public key, $K^p_m$. For security purposes, each of the central authority, the customer and the merchant may be responsible for selecting their respective public and private keys. The central authority may also be responsible for generating a merchant identification, "Mid," for the merchant which may contain the merchant's account, MACCT, and the merchant's public key, $K^p_m$. The central authority may generate a signed merchant identification, "SMid," that contains Mid and a $K^s_{ca}$-signed signature that is a function of Mid. The central authority may generate a customer identification, "Cid," for the customer, that contains the customer account, CACCT, and the customer's public key $K^p_c$. The central authority may generate a signed customer identification, "SCid," that contains Cid and a $K^s_{ca}$-signed signature that is a function of Cid. Each exemplary customer 105 may be associated with a customer identification, "Cid," that includes CACCT and a customer public key, $K^p_c$. Each of exemplary merchant 110 may be associated with a merchant identification, "Mid," that includes MACCT and merchant public key, $K^p_m$. Central authority 120 generates a signed customer identification, "SCid," for customer 105, that includes Cid and a $K^s_{ca}$-signed signature that may be a function of Cid. Central authority 120 generates a signed merchant identification, "SMid," for merchant 110, that includes Mid and a $K^s_{ca}$-signed signature that may be a function of Mid.

To begin, customer 105 visits a merchant 110 virtual store via INTERNET 115 (process step 305). The general concept of a "virtual store" is known and is presented for illustrative purposes. While browsing through the virtual store, customer 105 comes across an item of interest and sends a request for quotation to merchant 110 via INTERNET 115 (input\output step 310). As set forth hereinabove, quotation requests are application dependent and may be one of necessary, unnecessary or optional.

Merchant 110 receives the quotation request via INTERNET 115 from customer 105 (input\output step 315). In response to the request for quotation, merchant 110 sends the quotation to customer 105 (process step 320). According to the present embodiment, the quotation includes at least the $K^p_m$, a $K^s_{ca}$-signed signature that is a function of the MACCT, an unsigned copy of a price and a $K^s_m$-signed signature that is a function of the MACCT and the price.

In an advantageous embodiment, the quotation includes an unsigned sequence number that is unique to merchant 100. The $K^s_m$-signed signature may also be a function of the sequence number—the sequence number would uniquely identify the transaction thereby ensuring that duplicate orders, inadvertent or intentional, are ignored. If a sequence number is used, it should be unique to both the transaction and to merchant 110, although this is not necessary. It should be noted that the sequence number certainly does not have to be unique among all merchants transacting business over computer, or communications, network 115.

In another advantageous embodiment, the MACCT is associated with an expiration date. The quotation includes the expiration date and the $K^s_m$-signed signature may also be a function of the expiration date. The expiration date ensures that the MACCT, or Mid, is changed frequently which may help to prevent fraud should a particular MACCT, or Mid, become compromised. This aspect of the present embodiment is discussed in greater detail hereinbelow.

In yet another advantageous embodiment, central authority 120 has a central authority identification number ("CAid"). The quotation further includes the CAid and the $K^s_m$-signed signature may also be a function of the CAid. The CAid allows merchant 110 to reference itself to a commonly-trusted entity, such as central authority 120, a bank, an arbiter or the like.

Customer 105 verifies the MACCT and the price (decisional step 325) thereby verifying the identity of (authenticating) merchant 110 and the contents of each merchant 110's quotation. If the MACCT and the price are suitable (YES branch of decisional step 325) then customer 105 decides whether to place an order (decisional step 330).

In the event that the MACCT and the price are unsuitable (NO branch of decisional step 325) or if customer 105 decides not to place an order (NO branch of decisional step 330), then the transaction is terminated (process step 335), such as by sending a termination message from customer 105 to merchant 110, by customer 105 leaving the virtual store, etc.

If customer 105 decides to accept the quotation (YES branch of decisional step 330) it sends an order to merchant 110 (process step 340). The order includes at least the $K^p_c$, a $K^s_{ca}$-signed signature that is a function of the CACCT, an unsigned copy of the price and a $K^s_c$-signed signature that is a function of the CACCT, the MACCT and the price. Of course, in alternate embodiments, customer 105 and merchant 110 may engage in a bartering session, exchanging offers back and forth.

Most preferably, signed information in the quotation and the order are signed by applying a secure, one-way hash function and an encryption function to information to be signed. The signatures generated according to the protocol may be a function of hash numbers that are a function of the information hashed, rather than the information itself. Those skilled in the art are familiar with hash functions and their use in conjunction with cryptographic signatures.

In an advantageous embodiment, the order further includes the unsigned sequence number, such that the $K^s_c$-signed signature further being a function of the sequence number. The sequence number may be unique to the transaction and to merchant 110, and ensures that duplicate orders are ignored. The sequence number, again, does not have to be unique among all merchants transacting over computer, or communications, network 115. In this embodiment, the order may not be used by an eavesdropper to fraudulently purchase goods from the same or another merchant, since the order includes a signature of MACCT and the sequence number of the original quotation.

In another advantageous embodiment, an expiration date is associated with the CACCT, or Cid, the order also includes the expiration date, and the $K^s_c$-signed signature may be a function of the expiration date. The expiration date again ensures that CACCT and MACCT are changed frequently thereby preventing long term fraud, such as if a particular CACCT or MACCT becomes compromised.

In yet another advantageous embodiment, the order includes the CAid, and the $K^s_c$-signed signature is also a function of the CAid. The CAid allows both customer 105 and merchant 110 to reference themselves to a commonly-trusted entity, such as central authority 120, a bank, an arbiter or the like. Recall that the central authority associated with customer 105 and the central authority associated with merchant 110 may be separate entities.

In another advantageous embodiment, the Mid further includes the known public name of the merchant, the SMid contains Mid, and the $K^s_{ca}$-signed signature may be a function of Mid. The quotation includes SMid. The known merchant name allows customer 105 to verify that the quotation was sent by the intended merchant 110 and not by another merchant, who is fraudulently masquerading as merchant 110.

Merchant 110 verifies the CACCT, the MACCT and the price (decisional step 345), which may involve verifying Cid or Mid, thereby verifying the identity of (authenticating) the CACCT, the MACCT and the price. Merchant 100 then compares the CACCT, which may involve Cid, against a list of CACCTS, or Cids, revoked by central authority 120 (decisional step 350), thereby enabling central authority 120 to exercise governance over its CACCTS, and possibly Cids. The list of revoked CACCTS may be maintained in a database associated with merchant 110, such as in volatile memory 210 or disk 225 of FIG. 2 for example.

Exemplary merchant 110 maintains a record of purchases by customer 105 and may send a message to central authority 120 regarding customer 105 when its purchases exceed a predetermined maximum allowable amount (decisional step 355), thereby making CACCTS subject to credit limits.

Exemplary merchant 110 also maintains a record of purchases and times of the purchases by customer 105 and may send a message to central authority 120 regarding customer 105 when the purchases exceed a predetermined maximum allowable rate (decisional step 360), thereby tracking suspiciously high account activity (perhaps indicating fraud).

Merchant 105, as a function of a uniformly distributed random number (decisional step 365), may send a message to central authority 120 regarding customer 105 (process step 370), thereby providing an audit function whereby transactions that otherwise would not be regarded as suspicious are nonetheless reported. A range of the random numbers may be selectable (most preferably between 0% and 100%) to establish a reporting level and a corresponding confidence level for the audit findings. In this advantageous embodiment, the merchant 110 has control over the level of audit versus the number of messages sent to the central authority 120. More messages generally indicates higher overhead with better protection against fraud. Less messages generally indicates lower overhead with worse protection against fraud.

If the CACCT, the MACCT and the price are suitable then merchant 110 may reply to the order by filling the same (process 375). The order may be for data to be delivered via INTERNET 115. Again, information itself may often be a valuable commodity. The broad scope of the present invention contemplates the sale of information over a computer, or communications, network 115, as well as the sale of more traditional services or "hard" goods. The above-described protocol standardizes electronic commerce and is capable of supporting a high volume of transactions with low incurred cost.

In an advantageous embodiment, the CACCT may be an alias account. In a related embodiment, the MACCT may be an alias account. The present invention allows customer 105, merchant 110 or both to establish one or more aliases for doing business. Those skilled in the art are aware of the privacy advantages inherent in doing business anonymously. Of course, in the case of INTERNET 115, the underlying operating system (e.g., Unix®) may not ensure anonymity.

The broad concept of securely communicating a financial transaction is provided without requiring communication between central authority 120 and either merchant 110 or customer 105 during the transaction. This capability significantly reduces the bandwidth required to complete the transaction, as only three messages (the quotation, order and a reply thereto) are required to complete the transaction. The quotation may be sent in response to an optional quotation request sent from customer 105 to merchant 110. Moreover, since each of the quotation and the order include a signature, an unauthorized third party does not know the corresponding private key and, therefore, cannot alter the same. Thus both the quotation and the order may be transmitted using regular communication channels (e.g., TCP/IP protocol over the INTERNET without further encryption)

Most preferably, once customer 105 sends the order and merchant 110 accepts it (either with or without verification thereof), neither customer 105 nor merchant 110 is authorized to repudiate the transaction. It is preferred that only central authority 120 or an arbiter (to be discussed in detail below) be given that authority. Further, the use of public-key encryption techniques allows each party to authenticate the other and any information obtained from the other (such as price) without compromising encryption keys. Public key encryption is known.

In an advantageous embodiment, the quotation and the order are encapsulated in conventional HyperText Transfer Protocol ("HTTP") messages. Those skilled in the art are familiar with the widespread acceptance of the INTERNET and, more particularly, the WORLD WIDE WEB. The present invention, while not so limited, is particularly suited for use in the WORLD WIDE WEB, taking the form of encrypted contents in otherwise conventional HTTP messages. In one embodiment of the present invention, the protocol may be embedded in the HTTP used for communication between browsers and servers on the WORLD WIDE WEB. More specifically, the quotation is encoded inside a HyperText Markup Language ("HTML") page that merchant 110 sends to the customer 105's browser. Customer 105 submits his order to the merchant by encoding it inside a HTTP GET message that his WORLD WIDE WEB browser sends to merchant 110. In one alternate embodiment of the present invention, the protocol can be implemented by a set of Common Gateway Interface ("CGI") scripts on the server operated by merchant 110 for the purpose of conducting commerce on the WORLD WIDE WEB. In yet another embodiment of the present invention, the protocol can be implemented by an applet running on customer 105's browser when conducting commerce on the WORLD WIDE WEB. In this way, customer 105 and merchant 110 can use standard WORLD WIDE WEB tools, such as existing browsers and server software, without any change to these tools.

Figure 4:
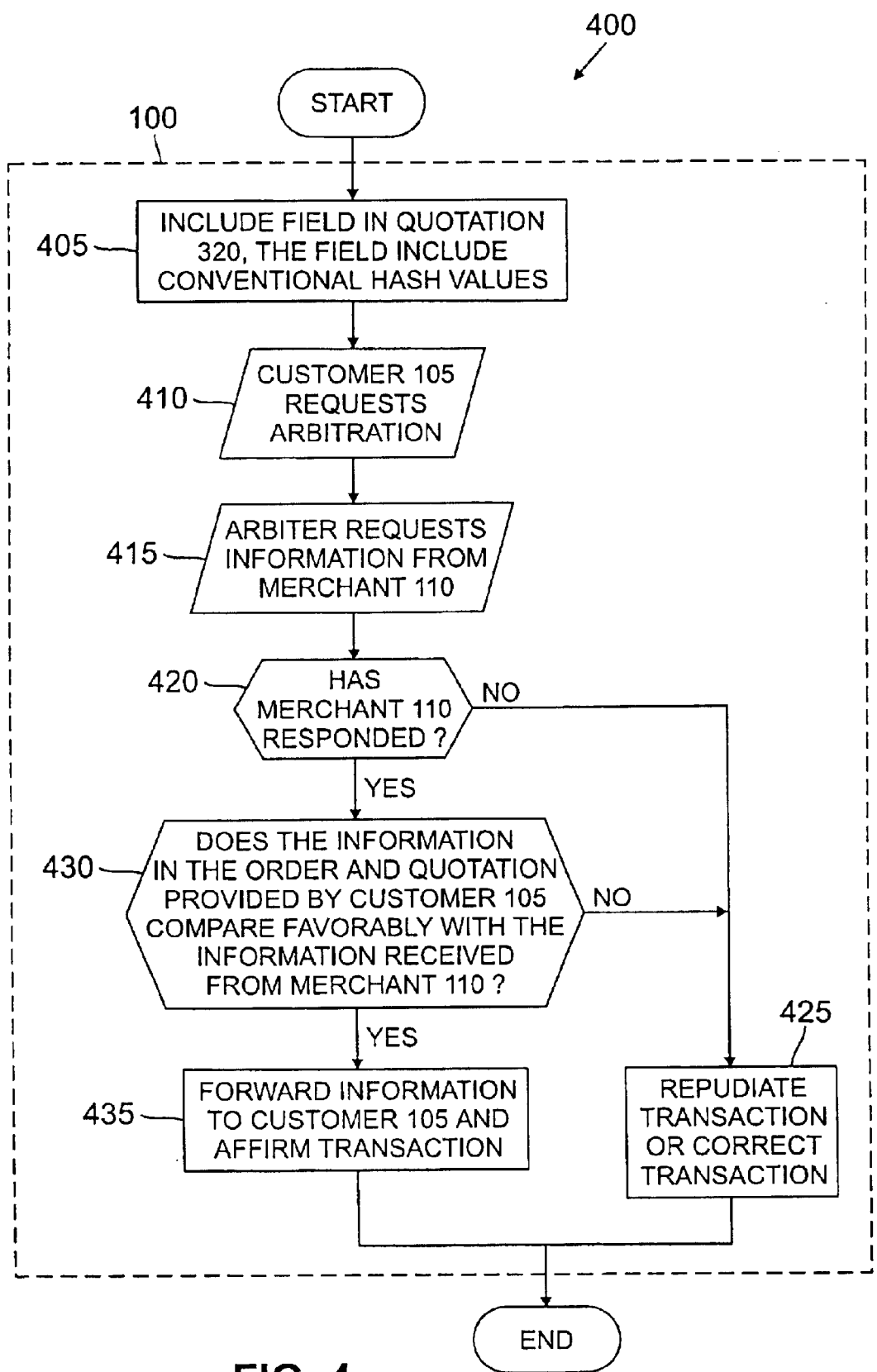
FIG. 4 illustrates a flow diagram of an exemplary method of arbitrating a dispute between the customer and the merchant of FIGS. 1 through 3 according the principles of the present invention.

Turning now to FIG. 4, illustrated is a flow diagram (generally designated 400) of an exemplary method of arbitrating a dispute between customer 105 and merchant 110 according to the exemplary protocol of FIG. 3. Assume for the purposes of illustration that customer 105 believes there is a dispute as to some aspect of the quotation and the subsequently filled order. To begin, merchant 110 may include a secure hash value field in the quotation that is a function of information that is a subject of the quotation (process step 405).

Customer 105, in response to receipt of the filled order sends an arbitration request to an arbiter, which, for the purposes of illustration, may be central authority 120 (process step 410). The arbitration request most preferably contains the quotation and the order. Arbiter 120 sends an information request to merchant 110 (process step 415). The information request most preferably requests a copy of the information that is the subject of the quotation, including the subject field. Arbiter 120, if merchant 110 fails to respond to the information request (NO branch of decisional step 420), repudiates the financial transaction (process step 425).

Arbiter 120, if the information correlates to the field (YES branch of decisional step 430), forwards the information that is the subject of the quotation to customer 105 and affirms the financial transaction (process step 435). Arbiter 120, if the information fails correlates to the field (NO branch of decisional step 430), repudiates or corrects, such as properly filling the order for example, the financial transaction (process step 425).

The exemplary arbitration procedure allows arbiter 120 to resolve conflicts between customer 105 and merchant 110. If customer 105 is at fault, arbiter 120 may suitably vouch for merchant 110's compliance with the contract. If merchant 110 is at fault (either by deviating from the originally bargained—for information or by failing to respond to the request for the information), arbiter 120 has the power to repudiate or rescind the financial transaction.

Figure 5:
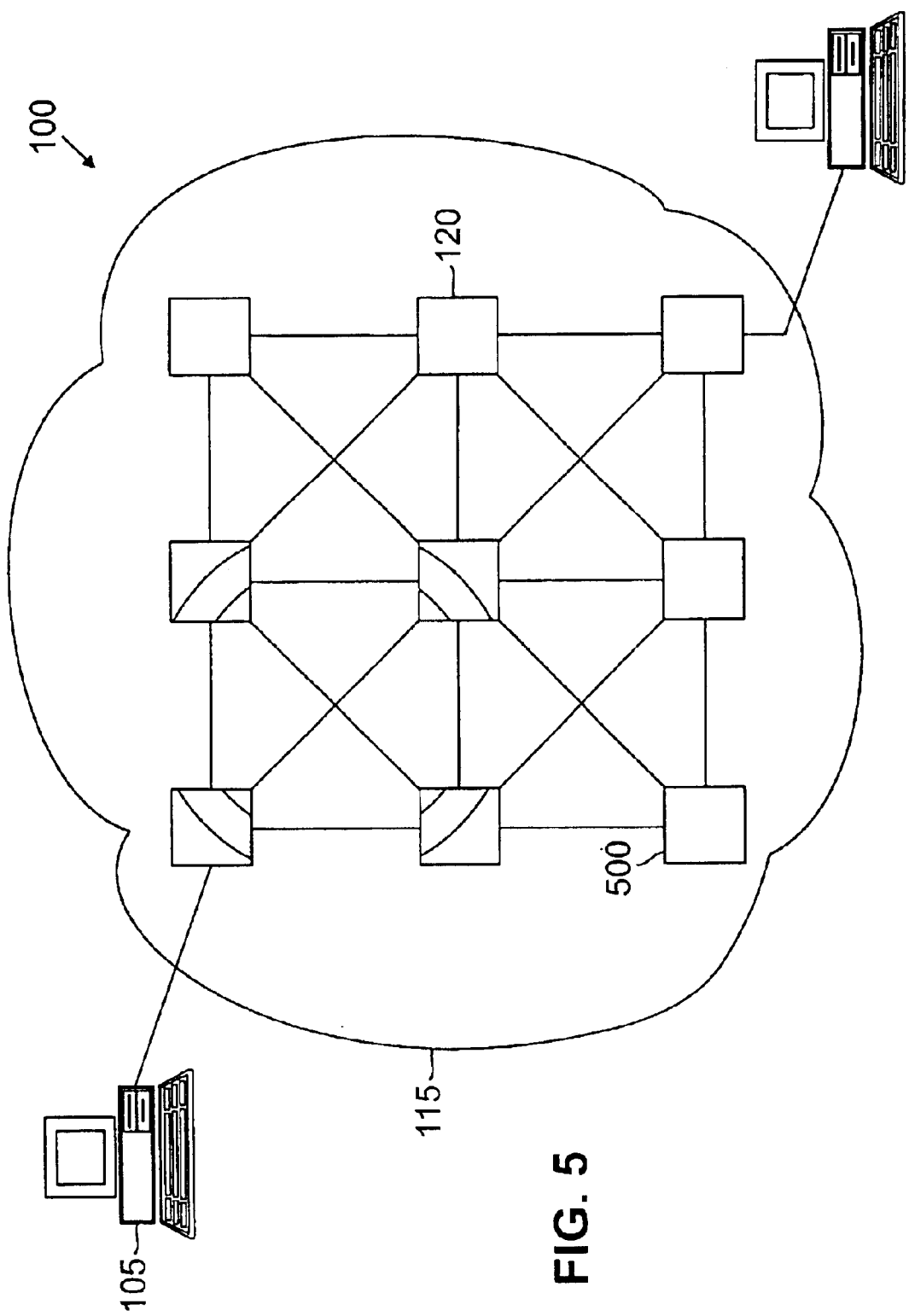
FIG. 5 illustrates a high-level block diagram of the exemplary distributed computer, or communications, network of FIG. 1 further illustrating each of the customer, the merchant and the network of networks.

Turning momentarily to FIG. 5, illustrated is a high-level block diagram of exemplary distributed computer, or communications, network 100 further illustrating each of customer 105, merchant 110 and network of networks 115. Note that network 115 illustrative includes each of central authority 120 and an arbiter 500.

Figure 6:
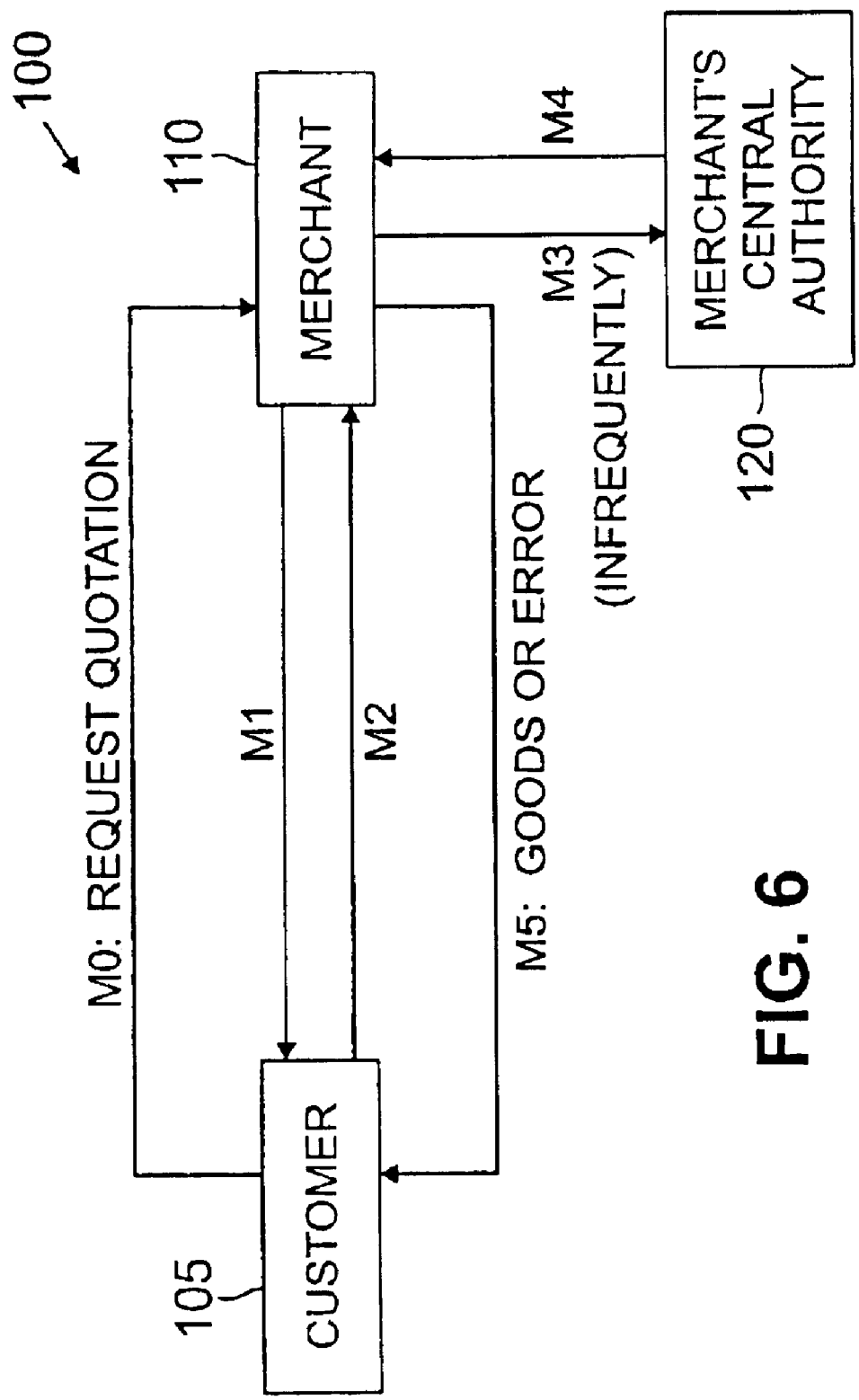
FIG. 6 illustrates another high-level block diagram of the exemplary distributed network of FIG. 1 wherein the exemplary protocol of FIG. 3 is suitably operating to securely communicate a financial transaction between the customer and the merchant.

Turning now to FIG. 6, illustrated is another high-level block diagram of exemplary distributed network 100 wherein protocol 300 is suitably operating to securely communicate a financial transaction between customer 105 and merchant 110. To begin, a request for quotation, M0, is sent from customer 105 to merchant 110. Merchant 110 replies to the request by forwarding the quotation, namely, M1 = merchant 110's signed identification SMid‖sequence number‖quoted price‖merchant 110's signed message (merchant 110's MACCT‖sequence number‖ quoted price) with merchant 110's private key $K_m^s$ Customer 105 may verify merchant 110's signed identification, most preferably checks merchant 110's identification expiration date, compares merchant 110's name with an expected merchant name, extracts merchant 110's public key from merchant 110's identification, and verifies the sequence number and quoted price. Customer 105 may decide to reply with an order, namely, M2 = customer 105's signed identification SCid‖sequence number‖quoted price‖customer 105's signed message (customer 105's account CACCT‖merchant 110's account MACCT‖sequence number‖ quoted price) with customer 105's private key $K_c^s$ If merchant 110 does not know the current $K^p{}_b$ of customer 105's bank, then merchant 110 most preferably sends a message, M3, to its central authority, or bank, 120 to determine the same, namely, $M3 = \text{Bid}$ wherein Bid is customer 105's bank's identification. Merchant 110 trusts central authority 120 to keep correct information about customer 105's bank, such as the bank's current public key, $K^P_b$, for example. Central authority 120 sends a reply message, M4, with customer 105's bank's current public key, namely, $$M4 = \text{Bid} \| K^P_b$$

In an advantageous embodiment, message M4 is communicated over a secure channel to avoid tampering, interception, fraud or the like. Typically, merchant 110 will retain $K^P_b$ for the remainder of the present billing period, thereby reducing the number of times it must contact central authority 120 and increasing network 100 bandwidth.

Merchant 110 verifies customer 105's signed identification, most preferably checks customer 105's identification expiration date, compares customer 105's name with an expected customer name, extracts customer 105's public key from customer 105's identification, verifies customer 105's signature of sequence number and price, and compares the price with the previously quoted price. The sequence number may be used as a key into a database of open transactions associated with merchant 110. If message M2 passes all verification procedures, tests or the like then merchant 110 commits the transaction and supplies the goods to customer 105, namely M5.

According to the illustrated embodiment, merchants submit transactions to the bank for billing by the end of the billing period. Ones of messages M1, M2 or M5 may suitably constitute proof of the transaction.

In an advantageous embodiment, information in the quotation and the order are represented by alphanumeric characters. Alternatively, of course, numeric, alphabetic or other characters may be employed to represent the information. The broad scope of the present invention is therefore not limited by any particular representation scheme.

Figure 7:
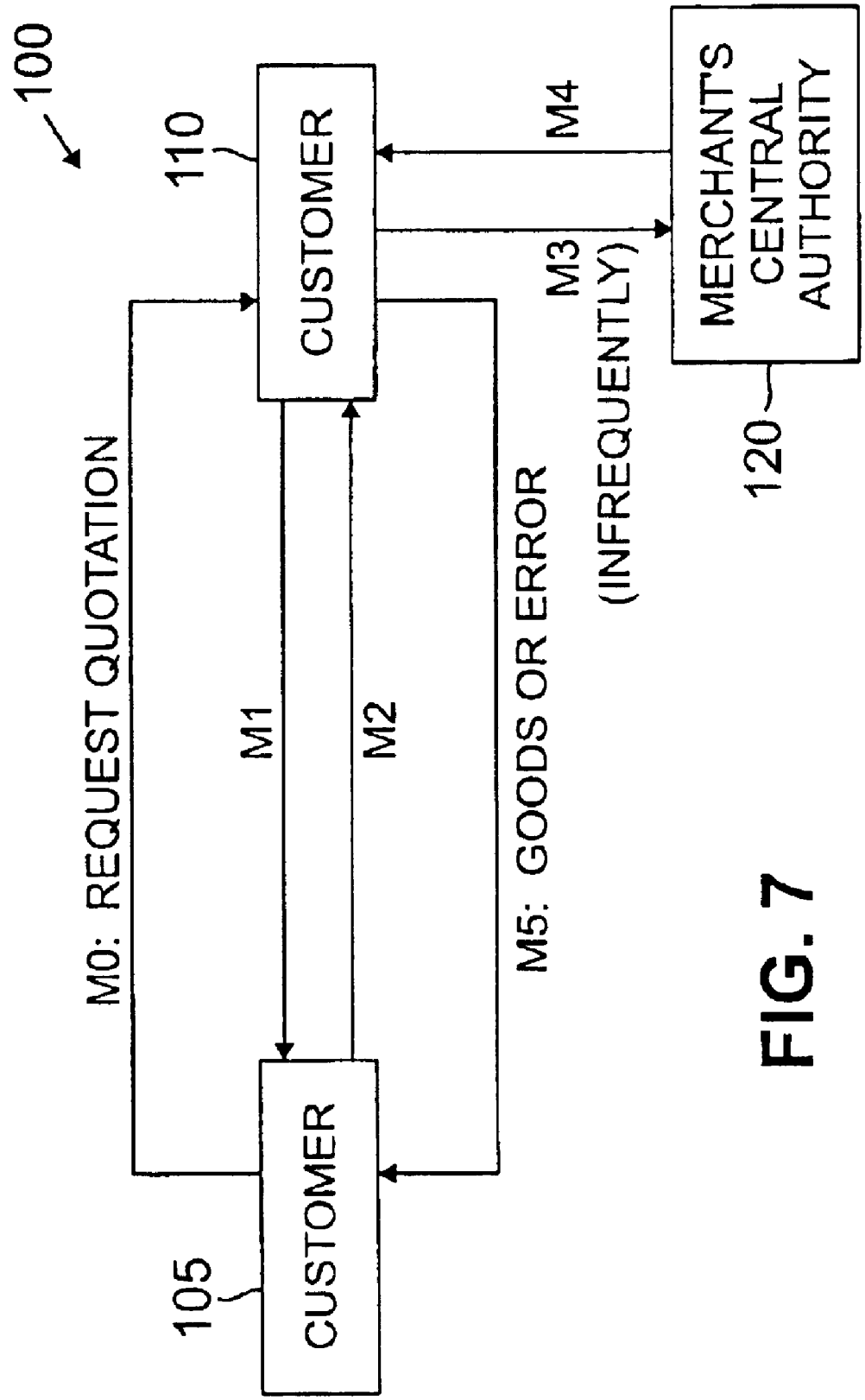
FIG. 7 illustrates another high-level block diagram of the exemplary distributed network of FIGS. 1 and 6 altered to limit on-line customer fraud, as discussed with reference to FIG. 3.

Turning now to FIG. 7, illustrated is another high-level block diagram of exemplary distributed network 100 of FIG. 6 illustrating a configuration for limiting on-line customer fraud, as discussed with reference to FIG. 3.

To begin, recall that exemplary central authority 120 is associated with a CAid, that an order placed by customer 105 may include the CAid, and that the $K^s_c$-signed signature in SCid may, in part, be a function of the CAid—the CAid allows both customer 105 and merchant 110 to associate themselves with a commonly-trusted entity, namely central authority 120, a bank, an arbiter or the like.

According to decisional step 345 of FIG. 3, merchant 110 verifies the SCid and the signature of the C$_{\text{ACCT}}$, M$_{\text{ACCT}}$ and the price thereby verifying the identity of, or authenticating, the C$_{\text{ACCT}}$, the M$_{\text{ACCT}}$ and the price. According to decisional step 350, merchant 100 compares the C$_{\text{ACCT}}$ against a list of C$_{\text{ACCTS}}$ revoked by central authority 120 thereby enabling central authority 120 to exercise governance over its C$_{\text{ACCTS}}$—the list of revoked C$_{\text{ACCTS}}$ possibly maintained in a database associated with merchant 110.

According to the illustrated embodiment, merchants occasionally communicate with central authorities, banks or the like with which they have pending or outstanding transactions. The central authorities, banks and the like may piggyback a list of revoked customer identifications/accounts on reply messages to the merchants, although, the central authority may broadcast a list of revoked customer identifications/accounts to the merchants.

Exemplary merchant 110 maintains a current list of revoked customer identifications/accounts and uses the same to process orders, refusing to accept any transaction associated with a revoked customer identification/account. Note that message processing stages M0 through M5 remain substantially the same. However, if the list of revoked customer identifications/accounts of customer 105's central authority 120' has not been recently updated, merchant 110 sends a message, M6, to customer 105's central authority 120' most preferably after message M2 is verified.

| | | |
|---|---|---|
| M6 | = | merchant 110's identification‖customer 105's identification‖a sum of customer 105's current and previous purchases‖merchant 110's signed message (merchant 110's identification‖customer 105's identification‖the sum of customer 105's current and previous purchases) with merchant 110's private key $K_m^s$ |

Central authority 120', in response to message M6, updates customer 105's balance in its account. If customer 105's purchase rate exceeds some threshold rate for some time period, T, or customer 105 exceeds its credit limit, central authority 120' rejects the transaction and may revoke customer 105' identification/account. Otherwise, central authority 120' accepts the transaction.

Central authority 120', upon completion of processing of message M6, sends a reply message, M7, to merchant 110, namely,

| | | |
|---|---|---|
| M7 | = | customer 105's identification‖accept/reject indicia from central authority 120'‖a list of revoked customer identifications/accounts‖central authority 120" signed message (customer 105's identification‖accept/reject indicia from central authority 120')‖a list of revoked customer identifications/accounts) with central authority 120" private key $K_{ca}^s$ |

Messages M6 and M7 should most preferably be sent using a secure communication channel to ensure privacy.

In an advantageous embodiment, merchants communicate with various central authorities periodically, and most preferably transfer batches of transactions. Batch communication may efficiently be performed during off-peak hours. To reduce overhead, central authorities or the like may piggyback lists of revoked customer identifications/accounts on any message to the merchant.

From the above, it is apparent that the present invention provides a protocol and system for securely communicating a financial transaction between a customer and a merchant and a distributed computer network employing the protocol or system. A central authority may be associated with a central authority private key, $K^s_{ca}$, and a central authority public key, $K^P_{ca}$, and is responsible for assigning a C$_{\text{ACCT}}$ to the customer and a M$_{\text{ACCT}}$ to the merchant. The customer is associated with a customer private key, $K^s_c$ and a customer public key $K^P_c$; the merchant is associated with a merchant private key, $K^s_m$, and a merchant public key, $K^P_m$. The protocol includes the steps of: (1) sending a quotation from the merchant to the customer, the quotation including at least the $K^P_m$, a $K^s_{ca}$-signed signature that is a function of the M$_{\text{ACCT}}$, an unsigned copy of a price and a $K^s_m$-signed signature that is a function of the M$_{\text{ACCT}}$ and the price, (2) replying to the quotation by sending an order from the customer to the merchant, the order including at least the $K^P_c$, a $K^s_{ca}$-signed signature that is a function of the C$_{\text{ACCT}}$, an unsigned copy of the price and a $K^s_c$-signed signature that is a function of the C$_{\text{ACCT}}$, the M$_{\text{ACCT}}$ and the price and (3) replying to the order by the merchant filling the order.

Although the present invention and its advantages have been described in detail, those skilled in the art should understand that they can make various changes, substitutions and alterations herein without departing from the spirit and scope of the invention in its broadest form.

What is claimed is:

1. A protocol for securely communicating a financial transaction between a customer and a merchant, a central authority having a central authority private key $K^s_{ca}$ and assigning a customer account (CACCT) to said customer and a merchant account (MACCT) to said merchant, said customer having a customer public key $K^p_c$, said merchant having a merchant public key $K^p_m$, said protocol comprising the steps of:

sending a quotation from said merchant to said customer, said quotation including said $K^p_m$, a $K^s_{ca}$-signed signature that is a function of said MACCT, an unsigned copy of a price and a merchant private key ($K^s_m$)-signed signature that is a function of said MACCT and said price;

receiving an order in response to said quotation, said order including said $K^p_c$, a $K^s_{ca}$-signed signature that is a function of said CACCT, an unsigned copy of said price and a customer private key ($K^s_c$)-signed signature that is a function of said CACCT, said MACCT and said price; and replying to said order by filling said order.

2. The protocol as recited in claim 1 wherein said quotation further includes an unsigned sequence number unique to said merchant, said $K^s_m$-signed signature further being a function of said sequence number.

3. The protocol as recited in claim 1 wherein said order further includes an unsigned sequence number unique to said merchant, said $K^s_c$-signed signature further being a function of said sequence number.

4. The protocol as recited in claim 1 wherein said MACCT has an expiration date associated therewith, said quotation further including said expiration date, said $K^s_m$-signed signature further being a function of said expiration date.

5. The protocol as recited in claim 1 wherein said CACCT has an expiration date associated therewith, said order further including said expiration date, said $K^s_c$-signed signature further being a function of said expiration date.

6. The protocol as recited in claim 1 wherein said central authority has a central authority identification number (CAid), said quotation further including said CAid, said $K^s_m$-signed signature further being a function of said CAid.

7. The protocol as recited in claim 1 wherein said central authority has a central authority identification number (CAid) said order further including said CAid, said $K^s_c$-signed signature further being a function of said CAid.

8. The protocol as recited in claim 1 wherein signed information in said quotation and said order are signed by applying a secure, one-way hash function and an encryption function to information to be signed.

9. The protocol as recited in claim 1 wherein information in said quotation and said order are represented by alphanumeric characters.

10. The protocol as recited in claim 1 wherein said quotation and said order are encapsulated in Hypertext Transfer Protocol (HTTP) messages.

11. The protocol as recited in claim 1 wherein said MACCT and said price are verifiable by said customer.

12. The protocol as recited in claim 1 wherein said CACCT, said MACCT and said price are verifiable by said customer.

13. The protocol as recited in claim 1 wherein said order is an order for data to be delivered via a computer network.

14. The protocol as recited in claim 1 wherein said CACCT is an alias account.

15. The protocol as recited in claim 1 wherein said MACCT is an alias account.

16. The protocol as recited in claim 1 wherein a database associated with said merchant contains a list of CACCTS revoked by said central authority, said protocol further comprising the step of comparing said CACCT against said list of CACCTS revoked by said central authority.

17. The protocol as recited in claim 1 further comprising the steps of:

maintaining, by said merchant, a record of purchases by said customer; and sending a message from said merchant to said central authority regarding said customer when said purchases exceed a predetermined maximum allowable amount.

18. The protocol as recited in claim 1 further comprising the steps of:

maintaining, by said merchant, a record of purchases and times of said purchases by said customer; and sending a message from said merchant to said central authority regarding said customer when said purchases exceed a predetermined maximum allowable rate.

19. The protocol as recited in claim 1 further comprising the step of sending a message from said merchant to said central authority regarding said customer as a function of a uniformly distributed random number.

20. The protocol as recited in claim 1 further comprising an arbitration procedure, comprising the steps of:

including a field in said quotation that is a function of information that is a subject of said quotation;

sending an arbitration request from said customer to an arbiter, said arbitration request containing said quotation and said order;

sending an information request from said arbiter to said merchant, said information request requesting a copy of said information that is said subject of said quotation;

forwarding said information that is said subject of said quotation to said customer if said information correlates to said field;

repudiating said financial transaction if said merchant fails to respond to said information request; and repudiating said financial transaction if said information fails to correlate to said field.

21. The protocol as recited in claim 1 wherein said order further includes a SCid and said merchant uses said SCid to verify said customer.

22. The protocol as recited in claim 1 wherein said quotation further includes a SMid and said customer uses said SMid to verify said merchant.

23. A system for securely communicating a financial transaction between a customer and a merchant, a central authority having a central authority private key $K^s_{ca}$ and assigning a customer account (CACCT) to said customer and a merchant account (MACCT) to said merchant, said customer having a customer public key $K^p_c$, said merchant having a merchant public key $K^p_m$, said system comprising:

a quotation transmission controller, associated with said merchant, that sends a quotation to said customer, said quotation including said $K^p_m$, a $K^s_{ca}$-signed signature that is a function of said MACCT, an unsigned copy of a price and a merchant private key ($K^s_m$)-signed signature that is a function of said MACCT and said price;

an order reception controller, associated with said merchant, that receives an order from said customer in response to said quotation, said order including said $K^p_c$, a $K^s_{ca}$-signed signature that is a function of said C$_{ACCT}$, an unsigned copy of said price and a customer private key (K$^s_c$)-signed signature that is a function of said C$_{ACCT}$, said M$_{ACCT}$ and said price; and an order confirmation controller that confirms said order to said customer.

24. The system as recited in claim 23 wherein said quotation further includes an unsigned sequence number unique to said merchant, said K$^s_m$-signed signature further being a function of said sequence number.

25. The system as recited in claim 23 wherein said order further includes an unsigned sequence number unique to said merchant, said K$^s_c$-signed signature further being a function of said sequence number.

26. The system as recited in claim 23 wherein said M$_{ACCT}$ has an expiration date associated therewith, said quotation further including said expiration date, said K$^s_m$-signed signature further being a function of said expiration date.

27. The system as recited in claim 23 wherein said C$_{ACCT}$ has an expiration date associated therewith, said order further including said expiration date, said K$^s_c$-signed signature further being a function of said expiration date.

28. The system as recited in claim 23 wherein said central authority has a central authority identification number (CAid), said quotation further including said CAid, said K$^s_m$-signed signature further being a function of said CAid.

29. The system as recited in claim 23 wherein said central authority has a central authority identification number (CAid), said order further including said CAid, said K$^s_c$-signed signature further being a function of said CAid.

30. The system as recited in claim 23 wherein signed information in said quotation and said order are signed by applying a secure, one-way hash function and an encryption function to information to be signed.

31. The system as recited in claim 23 wherein said quotation transmission controller and said order reception controller represent information in said quotation and said order by alphanumeric characters.

32. The system as recited in claim 23 wherein said quotation transmission controller and said order reception controller encapsulate said quotation and said order in Hypertext Transfer Protocol (HTTP) messages.

33. The system as recited in claim 23 wherein said customer verifies said M$_{ACCT}$ and said price.

34. The system as recited in claim 23 wherein said merchant verifies said C$_{ACCT}$, said M$_{ACCT}$ and said price.

35. The system as recited in claim 23 wherein said order is an order for data to be delivered via a computer network.

36. The system as recited in claim 23 wherein said C$_{ACCT}$ is an alias account.

37. The system as recited in claim 23 wherein said M$_{ACCT}$ is an alias account.

38. The system as recited in claim 23 wherein a database associated with said merchant contains a list of C$_{ACCT}$s revoked by said central authority, said order reception controller comparing said C$_{ACCT}$ against said list of C$_{ACCT}$s revoked by said central authority.

39. The system as recited in claim 23 wherein said merchant maintains a record of purchases by said customer and said system further comprises a purchase reporting controller that sends a message from said merchant to said central authority regarding said customer when said purchases exceed a predetermined maximum allowable amount.

40. The system as recited in claim 23 wherein said merchant maintains a record of purchases and times of said purchases by said customer and said system further comprises a purchase reporting controller that sends a message from said merchant to said central authority regarding said customer when said purchases exceed a predetermined maximum allowable rate.

41. The system as recited in claim 23 further comprising a purchase reporting controller that sends a message from said merchant to said central authority regarding said customer as a function of a uniformly distributed random number.

42. The system as recited in claim 23 wherein said quotation further includes a field that is a function of information that is a subject of said quotation, said system further comprising an arbitration controller that sends a copy of said information that is said subject of said quotation.

43. The system as recited in claim 23 wherein said quotation further includes a SMid and said customer uses said SMid to verify said merchant.

44. The system as recited in claim 23 wherein said order further includes a SCid and said merchant uses said SCid to verify said customer.

* * * * *